United States Patent
Mansberg

[15] 3,679,312
[45] July 25, 1972

[54] METHOD AND APPARATUS FOR MEASURING BIOLUMINESCENCE OR CHEMILUMINESCENCE FOR QUANTITATIVE ANALYSIS OF SAMPLES

[72] Inventor: Hyman P. Mansberg, Pound Ridge, N.Y.
[73] Assignee: Technicon Instruments Corporation, Tarrytown, N.Y.
[22] Filed: June 16, 1971
[21] Appl. No.: 153,536

[52] U.S. Cl. .................................356/36, 23/253, 250/71 R, 356/246
[51] Int. Cl. ....................G01n 1/00, G01n 21/38, G01n 1/10
[58] Field of Search...............356/36, 246; 250/71 R; 23/230, 23/253, 254

[56] References Cited
UNITED STATES PATENTS
2,549,574  4/1951  Condiff...................................356/246

Primary Examiner—Ronald L. Wibert
Assistant Examiner—V. P. McGraw

[57] ABSTRACT

Method and apparatus for the quantitative determination of an ingredient of a fluid sample by the degree of luminescence created when the sample is reacted with another substance. The apparatus includes a photometer having a planar light-receiving window and a conduit providing a sinuous passageway portion formed in a body having its axis lying in a plane parallel to the photometer window and in proximity thereto and constructed of a transparent material. The sinuous passageway portion effectively obscures the window and is of substantially the same overall area. This conduit has an outlet portion at one end of the sinuous passageway portion and has an inlet close to or in the other end of the sinuous passageway portion. A sample and a reagent flow together and are intermixed in close proximity to the sinuous passageway portion, and are fed into the aforementioned inlet for flow into and through the aforementioned sinuous passageway portion for a luminescent reaction therein. A device is provided for receiving a signal from the photometer and for recording the results of the analysis.

12 Claims, 3 Drawing Figures

PATENTED JUL 25 1972 3,679,312
FIG. 1
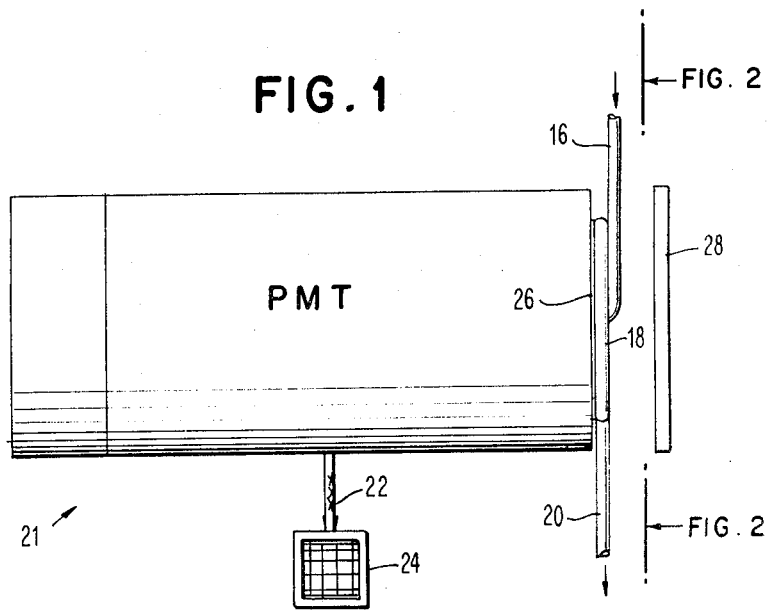
FIG. 3
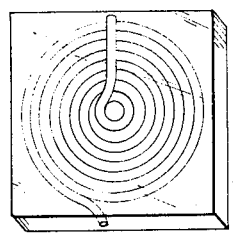
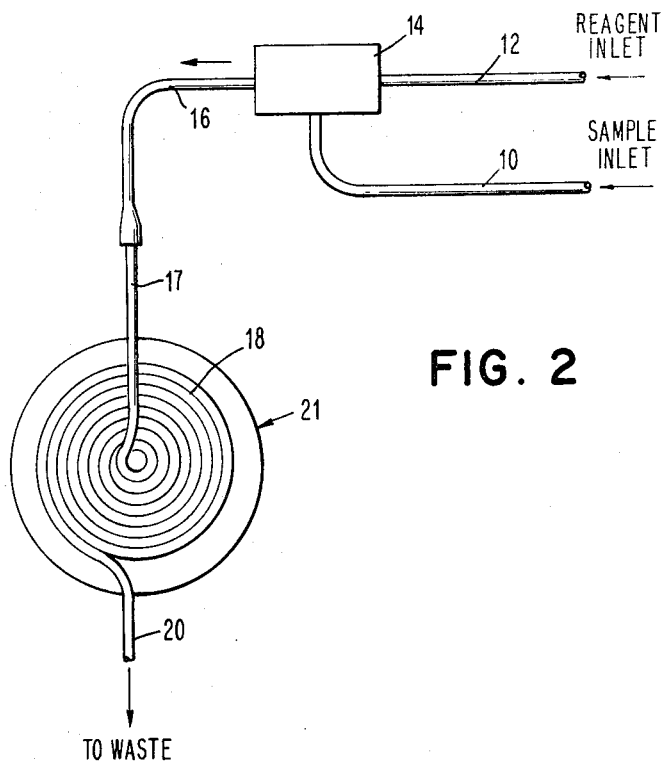
FIG. 2
INVENTOR.
HYMAN P. MANSBERG
BY Tedesco & Rockwell
ATTORNEY

METHOD AND APPARATUS FOR MEASURING BIOLUMINESCENCE OR CHEMILUMINESCENCE FOR QUANTITATIVE ANALYSIS OF SAMPLES

BACKGROUND OF THE INVENTION

1. Field of Invention

Method and apparatus for the quantitative determination of an ingredient of a fluid sample by the degree of luminescence created when the sample is reacted with another substance.

2. Prior Art

Bioluminescence and chemiluminescence are the emission of light when various biochemical or chemical substances are reacted at a temperature below that of incandescent bodies. Such luminescence is described by W. D. McElroy, H. H. Seliger, and E. H. White in "Mechanism of Bioluminescence, Chemiluminescence, and Enzyme Function in the Oxidation of Firefly Luciferin," Photochem. Photobiol. X, 153–170, 1969.

It is the effect, for example, of "cold light" emission as in the firefly, glowworm, and various types of bacteria. In the firefly, the enzyme luciferase and substrate luciferin react with Adenosine Triphosphate, commonly known as ATP, to emit a flash of light in the tail of the firefly.

This phenomena is being used increasingly for assay purposes. For example, it is a technique for detecting certain agents used in chemical warfare. All known living organisms contain ATP. Space probes for life detection employ ATP assays.

Bioluminescence, measured by a photometer, has been used in antibiotic susceptibility studies based on ATP assays of viable bacteria. Analyses of pure cultures of many bacteria species have shown that the concentration of cellular ATP can be correlated with the number of bacteria cells present. These studies, made for the purpose of enabling physicians to prescribe specific antibiotics to fight infectious diseases are well known and documented, for example, by E. W. Chappelle and G. V. Levin in "The Use of the Firefly Bioluminescent Assay for the Rapid Detection and Counting of Bacteria," Biochem. Med. II, 41–52, 1968.

While attempts have been made to automate ATP types of antibiotic susceptibility analysis utilizing a bioluminescence detector and measuring device, as far as is known, no such attempts have resulted in an efficient system which have utilized the commonly known and widely used principles of continuous flow analysis described in Skeggs U.S. Pat. No. 2,792,149 issued June 25, 1957 and Skeggs et al U.S. Pat. No. 3,241,432 issued Mar. 22, 1966. Such attempts have been documented by K. Van Dyke et al in An Automated Procedure for the Sensitive and Specific Determination of ATP appearing in Clinical Chemistry, Vol. 15, No. 1, pp. 3–14, 1969; and by W. S. Oleniacz et al in Detection of Micro-organisms by an Automated Chemiluminescence Technique appearing in Automation in Analytical Chemistry, Vol. 1, pp. 523–525, published by Mediad, Inc., White Plains, New York, 1967.

Certain prior automated analysis techniques utilizing measurements of bioluminescence for assaying ATP have consisted of injecting the sample containing ATP into a cuvette or test tube containing a luciferin-luciferase mixture. The substances are mixed together as quickly and thoroughly as possible. A flash of light is emitted the peak of which is proportional to the amount of ATP present, as well as that portion of the light emission which decays quickly after the peak to a low level and thereafter decays slowly over a period of many seconds.

The last-mentioned techniques obviously do not have the advantages of continuous flow analysis wherein one sample follows another in a stream and is subsequently analyzed photometrically or by some other means after treatment of the samples. The samples may be in gaseous form or in liquid form. Liquid samples may be segmented by inert fluids such as gas bubbles which serve to cleanse the wall of the tubing, effectively tending to prevent contamination between samples. In addition to such segments of inert fluids or in place thereof the segmentation may be formed by wash liquids, and in some monitoring operations, for example, it may be unnecessary to separate one sample from another in the flow of a sample stream which is monitored by the analysis apparatus.

SUMMARY OF THE INVENTION

One object of the invention is to provide an improved method and apparatus for the quantitative determination of an ingredient of a fluid sample by the degree of luminescence created when the sample is reacted with another substance, which lends itself well to antibiotic susceptibility and other types of analysis, and which incorporates features of automated continuous flow analysis.

Another object is to provide apparatus which includes a photometer having a planar light-receiving window and a conduit providing a sinuous passageway portion formed in a body having its axis lying in a plane parallel to the photometer window and in proximity thereto and constructed of transparent material, the sinuous passageway portion being in obscuring relation to the window and being of substantially the same overall area. This conduit has an outlet portion at one end of the sinuous passageway portion and has an inlet close to or in the other end of the sinuous passageway portion. A sample and reagent flow together and are intermixed in close proximity to the sinuous passageway portion, and are fed into the aforementioned inlet for flow into and through the aforementioned sinuous passageway portion for a luminescent reaction therein. A device is provided for receiving a signal from the photometer and for recording the results of the analysis.

BRIEF DESCRIPTION OF THE DRAWING

In the drawing:

FIG. 1 is a fragmentary, side elevational view of analysis apparatus embodying the invention;

FIG. 2 is a viewing looking in the direction of the arrows 2—2 of FIG. 1; and

FIG. 3 is a perspective view illustrating a detail of the apparatus and showing a modification thereof.

DETAILED DESCRIPTION OF THE PREFERRED EMBODIMENTS

In FIG. 2, there is shown a tube 10 having an inlet end thereof designated with the legend sample inlet. There is also shown in this view, a tube 12 having an end designated with the legend reagent inlet. The other ends of these tubes are connected to respective inlets of a fluid coupling, designated generally at 14, having an outlet connected to one end of a tube 16. The other end of the tube 16 is connected to one end or inlet portion 17 of a tube or conduit constructed of glass having the major portion thereof shaped to provide a sinuous passageway portion 18 and having an outlet at 20, which outlet may be to waste or to a suitable receptacle, if desired, for storage.

It will be noted that in the particular form shown in FIG. 2, the sinuous passageway 18 is constructed of turns of tubing or as a flat spiral. However, it is believed that it may be possible to provide a sinuous passageway wherein straight tubing sections are employed which are arranged side by side with reference to one another and joined at their corresponding ends to one another to provide a continuous passageway. It will also be noted that, as shown in FIG. 2, the inlet 17 to the sinuous passageway portion 18 is to its center and the outlet 20 is shown as being connected to the outer turn of the spiral. It is believed that these connections may be reversed, that is, that the inlet might be in the outer turn of the spiral and the outlet might be from the center of the spiral.

As indicated in FIG. 1, the sinuous passageway portion 18 provided by the flat spiral has the form of a body which lies in a plane parallel and in close proximity to the flat, end window of a photomultiplier tube 21 having a suitable electrical input (not shown) and a connection, as through a cable 22, to a recorder 25 of a conventional strip-chart type, employing a moveable stylus (not shown) cooperating with an advancing strip of chart paper to record the results of the analysis.

As indicated in FIG. 1, the body providing the sinuous passageway 18 is coupled to the photomultiplier tube window by optical grease or immersion oil, as at 26, to effectively cope with problems of light refraction in the area between the body 18 and the photomultiplier tube window.

It is believed made clear from the foregoing that the luminescent reaction, of the bioluminescent or chemiluminescent type, takes place in the sinuous passage 18, the initial or peak part of the reaction being detected and measured there as well as the tail end response of the reaction. To enhance the degree of light to which the photomultiplier tube is subjected by the aforementioned reaction, a mirror 28 may be provided parallel and adjacent to the sinuous passageway portion 18, having a reflective surface in opposing relation thereto and in opposing relation to the window of the photomultiplier tube. It may be found that the mirror 28 is not needed. While there may be some light reflected in the sinuous passageway 18, substantially all of the energy is transmitted to the photomultiplier tube due to the construction of the body 18 and its association with the photomultiplier tube. It may be noted that the body 18 substantially obscures the photomultiplier window, the body being of substantially the same size as the window.

While in FIG. 2 it is indicated that the confluence of the sample and reagent streams are in the fluid coupling 14 shown spaced some distance from the sinuous passageway portion 18, for simplicity and ease of understanding the drawing, in actual practice it is desirable that the confluence of these streams be as close to the sinuous passageway portion 18 as possible, and, in fact, the confluence may be within the sinuous passageway 18. This is to assure that the entire luminescent reaction occurs within the sinuous passageway portion 18.

The fluid coupling 14 may be structured simply. Its sole function is to provide suitable inlets for the sample and reagent streams and the mixing thereof and providing an outlet for the resultant stream. If desired the fluid coupling may have more than two inlets.

While it will be apparent to those versed in the art that the sample and reagent inlets shown in FIG. 2 may be fed from suitable, respective, reservoirs of these fluids as by gravity, for example, the sample inlet tube 10 may be fed from a sample supply device similar to that shown in de Jong U.S. Pat. No. 3,134,263 issued May 26, 1964, which device includes a rotary table supporting a circumferentially arranged series of samples in suitable chambers which chambers are successively registrable with an offtake aspirating the samples as by a peristaltic pump. The last-mentioned device is effective to provide a stream of longitudinally spaced liquid samples in which the liquid samples are separated from each other by intervening segments of a wash liquid disposed between a plurality of gas segments.

If, as is shown there, the last-mentioned sample supply device is used to supply samples to the sample inlet of FIG. 2, it may be used in conjunction with a peristaltic pump downstream from the last-mentioned device and upstream from the sample inlet of FIG. 2. The pump may be of the type shown and described in U.S. Bilichniansky et al. U.S. Pat. No. 3,425,357 issued Feb. 4, 1969. Such a pump is effective to feed the reagent inlet of FIG. 2 with a segmented or non-segmented stream of reagent, while simultaneously conveying a sample to the sample inlet of the last-mentioned view. As previously indicated, the sample inlet may be connected to a stream, as in a monitoring process, to be monitored by the analysis apparatus.

The recorder 24, operated by the photomultiplier tube, may be similar to that described in Pelavin U.S. Pat. No. 2,960,910, issued May 26, 1964. As previously indicated, the sampler of U.S. Pat. No. 3,134,263, supra, has discrete sample chambers. These chambers may contain conventionally prepared extracts of bacteria, one sample of bacterium being supported in each chamber, the samples being unique with reference to one another.

Also as previously indicated, the reagent used particularly in ATP types of analysis may be a luciferin-luciferase mixture stored in a suitable bottle from which it may be pumped as aforesaid in proper proportion to the volume of sample, all as is conventional and shown and described in Skeggs et al U.S. Pat. No. 3,241,432 issued Mar. 22, 1966. This technique provides a high degree of sensitivity, accuracy, and reproducibility when used for the counting of bacteria specimens according to ATP principles.

With references to use of the method and apparatus for measurement of chemiluminescence, the ATP technique may be utilized for determination not only of the adenosine phosphates but also of other substances, such as enzymes including hexokinase, as recorded by B. L. Strehler and J. R. Tottler 1954), Determination of ATP and Related Compounds: Firefly Luminescence and Other Methods, In Glick, D., ed.,"Methods of Biochemical Analysis," Vol. 1, Interscience, New York, and London, pp. 341—356. It is indicated there that hexokinase may be determined by introducing a constant amount of ATP plus glucose into a vessel containing firefly enzyme, and noting the rate of decay of luminescence as a function of the amount of hexokinase added to the mixture.

Also with reference to the use of the method and apparatus for measurement of chemiluminescence, the technique may be utilized, without employing ATP, for the detection, for example, of riboflavin. For this assay, a sample containing riboflavin may be introduced in this system through the illustrated sample inlet and a 30 percent solution of hydrogen peroxide may be used as a reagent for this assay and introduced into the illustrated reagent inlet. The degree of chemiluminescence which occurs in the sinuous passageway portion 18 of the system is indicative of the amount of riboflavin contained in the sample. It produces a red glow which is detected and measured by the photomultiplier tube 21 from which signals are generated to the recorder 24 as aforesaid.

As shown in FIG. 3, there may be provided a modified form of the body having a sinuous passageway therein similar to the aforementioned passageway portion 18 previously described. In FIG. 3, there is shown a block 30 of glass which may be cast, having a sinuous passageway portion 32 therein. The passageway portion 32 is provided with an inlet and an outlet similar to the previously described inlet 17 and outlet 20. The body with the sinuous passageway portion 32 formed therein may be constructed in accordance with the teachings of Anastor U.S. Pat. No. 2,072,194 issued Mar. 2, 1937. A length of sinuous metal tubing is cast, with the ends of the tubing exposed, into a glass block of the desired dimensions, and then the tubing is removed by an etching fluid pumped through the tubing. In this manner, the sinuous passageway may be formed in glass and the glass material between the turns of, say, a flat spiral passageway may be very thin. Such a passageway portion may be advantageously used in accordance with the present invention to transmit a luminescent reaction therein to the photomultiplier tube 21.

It has been noted previously that the inlet and the outlet of the sinuous passageway portion may be reversed, that is, that the inlet may be to the outer turn of the sinuous passageway and the outlet connected to the innermost turn of the passageway, but the illustrated arrangement is preferable because of the conventional structure of photomultiplier tubes in which the peak of light emission is best detected and measured by the tube when it is in the center of the tube window.

While the presently preferred forms of the invention have been illustrated and described, it will be understood, especially by those versed in the art, that the method and apparatus for measurement of bioluminescence or chemiluminescence for quantitative analysis purposes may take other forms and is susceptible of various changes in details without departing from the principles of the invention.

What is claimed is:

1. In apparatus for the quantitative determination of an ingredient of a fluid sample by the degree of luminescence created when the sample is reacted with another substance: sample supply means, reagent supply means, a photometer having a planar light-receiving window, first conduit means providing a sinuous passageway portion formed in a body having its axis lying in a plane parallel to said photometer window and in proximity thereto, said sinuous passageway portion being structured of a transparent material, and said sinuous passageway portion effectively obscuring said window and being substantially of the same overall area, said first conduit means having an inlet and an outlet at the respective ends of said passageway portion, fluid coupling means in proximity to said passageway portion and having an outlet connected to said inlet of said first conduit means, said fluid coupling means having at least two inlets, means defining second and third conduits respectively coupling said fluid inlets of said fluid coupling means to said sample supply means and said reagent supply means, means to cause fluid flow in said second and third conduit means from said sample supply means and said reagent supply means to said fluid coupling means for flow from said fluid coupling outlet into said sinuous passageway portion for a luminescent reaction therein, and means for receiving a signal from the photometer and for recording the results of the analysis.

2. Apparatus as defined in claim 1, wherein: said sinuous passageway portion is formed as a flat spiral.

3. Apparatus as defined in claim 1, wherein: said sinuous passageway portion is formed as a flat spiral, and said inlet to said first conduit is to the central region of the spiral.

4. Apparatus as defined in claim 1: further including a light reflective element having a reflective surface opposing said photometer window and disposed on the side of said conduit body remote from said window, to reflect toward said window light emanating from said body.

5. Apparatus as defined in claim 3: further including a light reflective element having a reflective surface opposing said photometer window and disposed on the side of said conduit body remote from said window, to reflect toward said window light emanating from said body.

6. Apparatus as defined in claim 2, wherein: said spiral passageway portion of said first conduit is formed of tubing having the turns thereof disposed closely adjacent one another.

7. Apparatus as defined in claim 2, wherein: said spiral passageway portion of said first conduit is formed in a block and in which the turns of the spiral are disposed closely adjacent one another.

8. Apparatus as defined in claim 6: further including a light reflective element having a reflective surface opposing said photometer window and disposed on the side of said conduit body remote from said window, to reflect toward said window light emanating from said body.

9. Apparatus as defined in claim 7: further including a light reflective element having a reflective surface opposing said photometer window and disposed on the side of said conduit body remote from said window, to reflect toward said window light emanating from said body.

10. A method for the quantitative determination of an ingredient of a fluid sample by the degree of illuminescence created when the sample is reacted with another substance and the reaction is detected by a windowed photometer generating signals to an analysis recording device comprising:

Flowing in a first stream of sample fluid from a source,
Flowing in a second stream of reagent from a source,
Combining said first and second streams to mix them together and form a third stream,
Flowing the third stream in a transparent confining medium in a sinuous path in front of said photometer window in a direction parallel to the plane of the window so that light energy from an illuminescent reaction over a period of time of the sample with the reagent is transmitted to said photometer for generation of signals to said analysis recording device.

11. The method as defined in claim 10, further including flowing said third stream in a sinuous direction outwardly from the central region of said photometer window.

12. The method as defined in claim 11, further including flowing said third stream in a flat spiral course.

* * * * *